J. P. GAUTHIER.
APPARATUS FOR THE MANUFACTURE OF PACKING RINGS.
APPLICATION FILED APR. 1, 1910.

988,087.

Patented Mar. 28, 1911.

Witnesses:

Inventor:

J. P. GAUTHIER.
APPARATUS FOR THE MANUFACTURE OF PACKING RINGS.
APPLICATION FILED APR. 1, 1910.

988,087.

Patented Mar. 28, 1911.

Witnesses:
Jean Germain
Guillaume Dioche

Inventor:
Jules Prosper Gauthier

J. P. GAUTHIER.
APPARATUS FOR THE MANUFACTURE OF PACKING RINGS.
APPLICATION FILED APR. 1, 1910.

988,087.

Patented Mar. 28, 1911.

Witnesses:

Inventor:

J. P. GAUTHIER.
APPARATUS FOR THE MANUFACTURE OF PACKING RINGS.
APPLICATION FILED APR. 1, 1910.

988,087.

Patented Mar. 28, 1911.

Witnesses:

Inventor:

J. P. GAUTHIER.
APPARATUS FOR THE MANUFACTURE OF PACKING RINGS.
APPLICATION FILED APR. 1, 1910.

988,087.

Patented Mar. 28, 1911.

Witnesses:

Inventor:
Jules Prosper Gauthier

J. P. GAUTHIER.
APPARATUS FOR THE MANUFACTURE OF PACKING RINGS.
APPLICATION FILED APR. 1, 1910.

988,087.

Patented Mar. 28, 1911.

Witnesses:

Inventor:

UNITED STATES PATENT OFFICE.

JULES PROSPER GAUTHIER, OF VILLEURBANNE, FRANCE.

APPARATUS FOR THE MANUFACTURE OF PACKING-RINGS.

988,087. Specification of Letters Patent. Patented Mar. 28, 1911.

Application filed April 1, 1910. Serial No. 552,810.

*To all whom it may concern:*

Be it known that I, JULES PROSPER GAUTHIER, a citizen of the French Republic, residing at Villeurbanne, Rhône, in France, have invented certain new and useful Improvements in Apparatus for the Manufacture of Packing-Rings, of which the following is a specification.

This invention relates to an improved apparatus for the manufacture of metal-plastic packing rings, that is to say, a packing ring comprising two thicknesses of metal between which is interposed a resilient or plastic material. In the manufacture of such packing rings the operation of setting a washer of asbestos or other substance within a metal ring has hitherto been effected by hand, which does not permit of obtaining a uniform thickness of said packing ring, such thickness varying according to the pressure exerted by the operator and also with the elasticity of the asbestos and the quality of the metal employed.

This invention consists of apparatus by which the manufacture of packing rings of this class may be very rapidly and accurately effected.

In the operation of the apparatus, the metal ring previously stamped, countersunk and lined with its washer of asbestos, is placed on a support where it is fixed by means of a circular extensible holder of adjustable height. A vertical shaft given a movement of rotation, carries with it two burnishers or pressing rolls mounted on said holder and adapted to be moved from their axis of rotation. The burnishers have the effect of bending the metal and turning it over on to the asbestos washer with a suitable pressure, whereby the packing ring thus formed is given an absolutely uniform thickness throughout.

In order that the invention will be readily understood, embodiments of the apparatus are illustrated in the accompanying drawings in which—

Figures 1 to 4 illustrate in a general manner a simple form of apparatus covering the principle of the invention and Figs. 5 to 16 represent an improved machine according to this invention adapted for the rapid and automatic manufacture of the metal-plastic packing rings. This latter machine is characterized by a combination of coöperating parts insuring the different movements necessary for forming the packing rings. Further, in order to increase the productive output of the machine it comprises a plurality of supports or carriers mounted on a turntable given an intermittent rotational movement which conducts the various supports or carriers in succession under the burnishers, the finished ring being automatically ejected by the action of said turntable.

Referring more particularly to the drawings, Fig. 7 is a horizontal section on line 7—7 of Fig. 5. The remaining figures are detail views on an enlarged scale, of the principal parts of this machine, Fig. 8 being a transverse section of the burnisher support shown in the position for regulating the burnishers.

Figure 1:
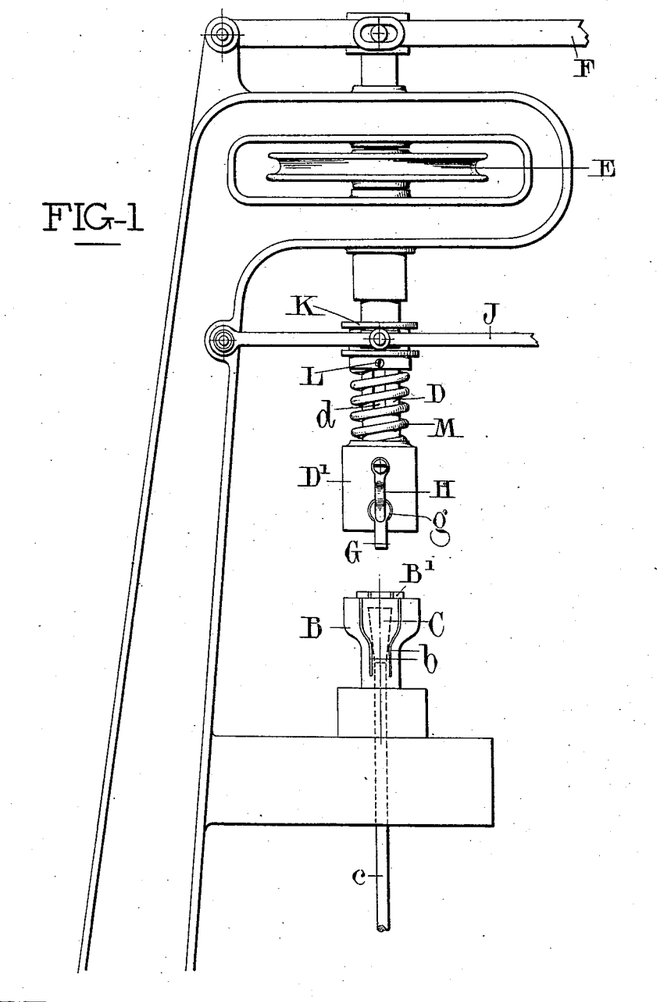
Fig. 1 is an elevation of a form of construction of the machine.
Figures 2, 4:
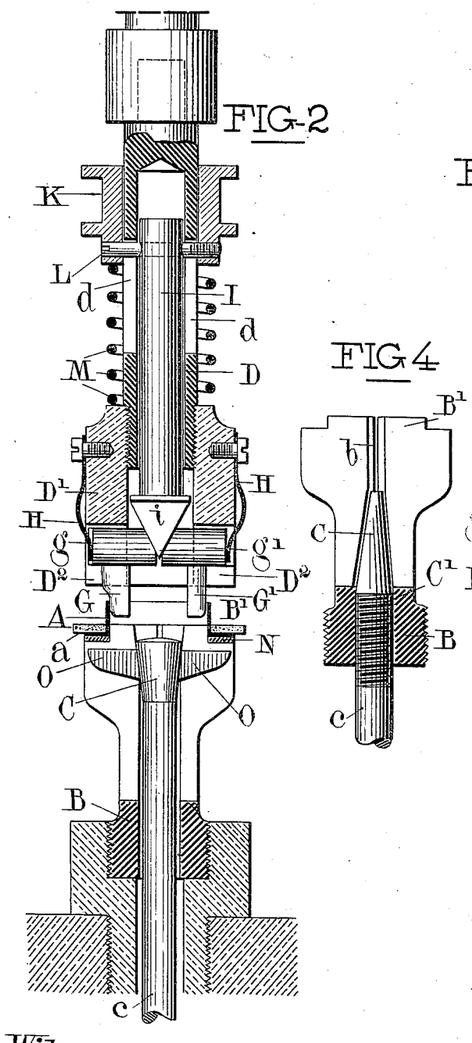
Fig. 2 is a vertical section on an enlarged scale of the burnisher actuating mechanism in position at the commencement of its action for forming a ring.
Fig. 4 is a vertical section of a modified form of support.
Figure 3:
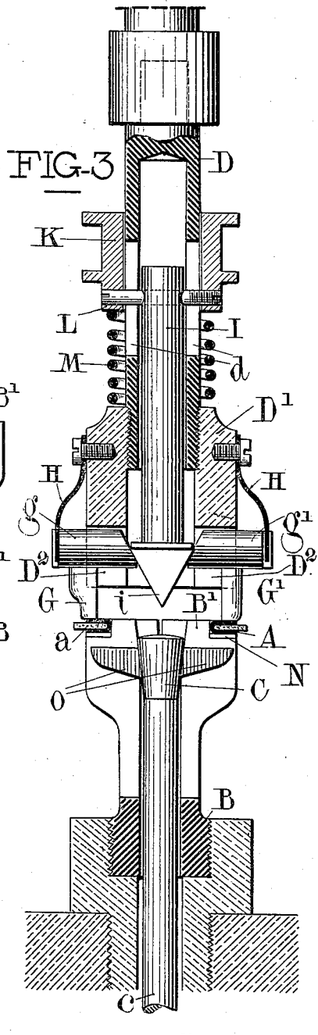
Fig. 3 is a similar view to Fig. 2 showing the parts in their final position, the ring being finished.
Figure 5:
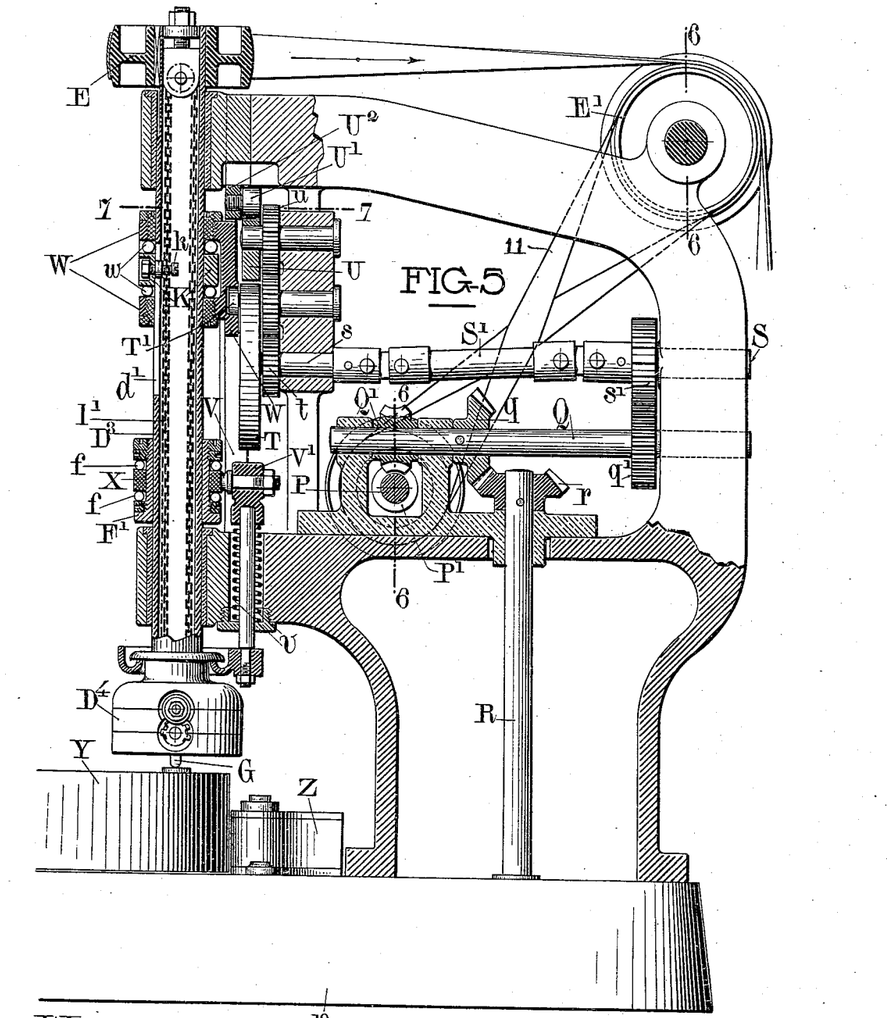
Fig. 5 is a side view of the improved automatically operating machine shown partly in vertical section and partly in elevation.

Referring to the form of machine shown in Figs. 1 to 4, the metal ring A and the asbestos washer $a$ (Figs. 2 and 3) previously arranged as shown in Fig. 2, are placed on a support B surrounding a holder $B^1$ disposed on said support. The latter is provided with diametrical openings $b$ of any suitable number, which impart a certain flexibility to the body of said support. The support is provided with a central perforation forming a conical matrix in which works a conical mandrel C, said mandrel terminating in a rod $c$. The said mandrel operates to separate the walls of the support, so that the edges of the holder $B^1$ are forced against the interior wall of the ring A and thus prevent its axial rotation. The conicity of the mandrel C can be downwardly directed as shown in Figs. 2 and 3, the desired effect being produced by downward traction on the rod $c$ or on the contrary can be upwardly directed as in Fig. 4 in which case the wedging action of the holder $B^1$ is produced by raising the rod $c$. The movement of said rod can be produced in either case by means of a pedal or lever of any kind (not shown) or by screwing a threaded part $C^1$ of said rod into the support B (Fig. 4) whereby the rod can be caused to ascend or descend relatively to said support. Above the support B is mounted a vertical hollow shaft D which is given a rotary movement by means of the pulley E slidably mounted thereon (Fig. 1). The said shaft is also capable of vertical displacement under the action of a lever F. To the lower end of the shaft D is screwed a sleeve $D^1$ in which are two oppositely disposed grooves $D^2$ each receiving one of the burnisher carriers $g\ g^1$ which are normally drawn toward the center by means of springs H H. The burnishers $G\ G^1$ are arranged below and each have a different profile, as hereinafter explained. In the interior of the shaft D and rotating therewith is a rod I the lower end of which, terminates in the form of a wedge $i$, which engages between the two burnisher carriers $g\ g^1$ and tends to separate same when the rod is lowered as shown in Fig. 3. The ascending and descending movements of the rod I are controlled by a lever J (Fig. 1) which engages a collar K surrounding the shaft D and secured to the rod I by means of a pin or key L which slides in slots $d\ d$ in the shaft D to permit the free movement of the rod I within the interior of said shaft. By depressing the lever J the rod I is moved downward and consequently the burnishers are separated and on releasing said lever a spring M lifts the collar K and consequently the rod I while the springs H return the burnishers to their original positions.

The operation of the apparatus is as follows. The metal ring A being in place and conveniently fixed as described, the shaft D is rotated and the burnishers $G\ G^1$ (Fig. 2) are lowered by means of the lever F until they come in contact with the upper face of the holder $B^1$. At this moment the lever J is actuated so that the two burnishers $G\ G^1$ are separated and press back the upturned portion of the metal. For this purpose one of the burnishers, for example G, is formed slightly conical at the side so as to facilitate the outward bending of the metal while the other burnisher $G^1$ is flat to its base so as to produce the pressing of the ring by forcibly compressing it from the interior rim to the exterior of the crown. It should be remarked that the thickness of the ring is strictly determined by the distance which the holder $B^1$ extends beyond the upper surface of the support B, and that this thickness is the same on all the surface of the ring. Such thickness may be readily varied by the placing below the ring washers N N of a definite thickness so as to reduce it to a convenient height. When the burnishers $G\ G^1$ arrive at the end of their outward movement (Fig. 3) and the packing-ring is made, the shaft D is raised by means of the lever F and the other lever J is released to allow the burnishers to return to their original position; the ring being then easily removable by withdrawing the mandrel C. Two arms O O can be arranged on the mandrel C and housed in the openings $b$ and by giving the rod $c$ a sharp rising movement said arms will strike against the lower surface of the ring and automatically eject same. To facilitate this ejection the machine could be arranged in an inclined direction, any suitable means being employed for actuating said arms or others answering the same purpose.

Figure 6:
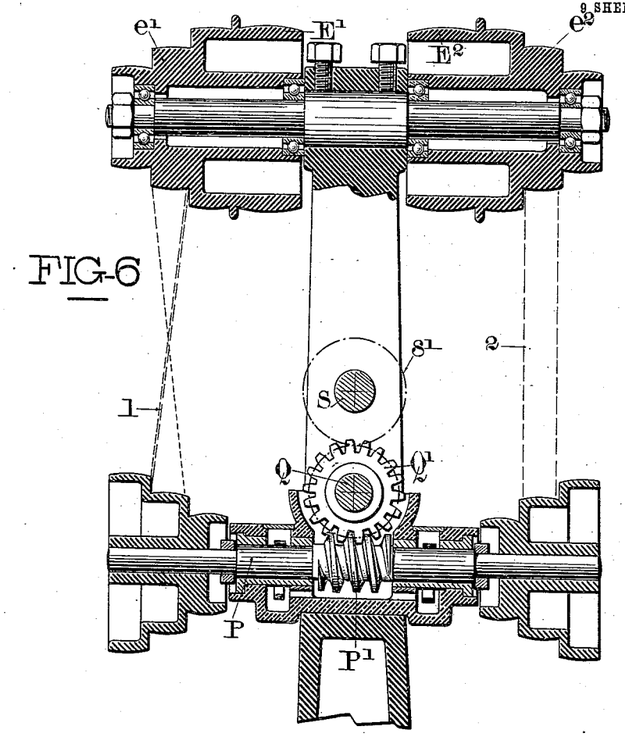
Fig. 6 is a section on the line 6—6 of Fig. 5.
Figure 7:
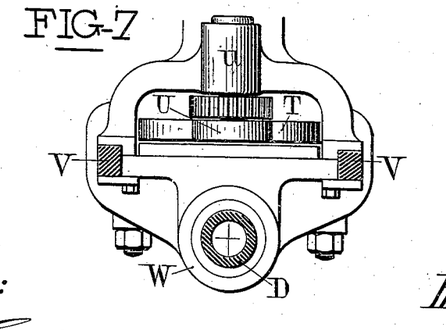

Referring to the machine shown in Figs. 5 to 16 which illustrate an automatic machine with six blank holders, this machine comprises a hollow vertical shaft $D^3$, which is given a rapid rotary movement; the lower end of this shaft supports the burnisher carrier $D^4$, arranged above the turntable Y, said carrier $D^4$ being actuated as hereinafter more fully described by means of an endless chain $I^1$, housed within the shaft $D^3$ and given a to-and-fro movement by suitable mechanism. The rotation of the shaft $D^3$ is effected by means of a horizontal pulley E mounted on a long key to permit upward and downward movements of the shaft; this pulley being driven by a belt passing over guide pulleys $E^1$ and $E^2$ and actuated by any suitable motor (not shown). The pulleys are provided with lateral extensions $e^1\ e^2$ integral and rotating therewith. The said extensions $e^1$ and $e^2$ drive a shaft P by means of a crossed belt 1 and a straight belt 2 (Fig. 6). The shaft P has a worm $P^1$ meshing with a worm wheel $Q^1$ keyed on a shaft Q arranged transversely to the shaft P. The shaft Q drives a vertical shaft R by means of beveled pinions $q$ and $r$, and also a shaft S by means of pinions $q^1$, $s^1$. The shaft S actuates, by means of a transmission shaft $S^1$ or by any other suitable means, the shaft $s$ of a crank-disk T, and this shaft drives by means of a gear train $t, u$, a cam U which acts on a roller $U^1$ supported by a cross-bar $U^2$ which forms part of a sliding carriage comprising also two vertical parallel slides V (Figs. 5 and 7) sliding in suitable guides on the frame of the machine and connected at the bottom by a cross-bar V¹. To the cross-bar V¹ is attached a collar X which embraces a socket F¹, secured to the shaft D³. The collar X is held between two ball bearings $f$, carried by the socket F¹ so that the socket F¹ can rotate freely. The socket F¹ and the shaft D³ are caused to participate in all the vertical movements of the collar X which the cam U transmits by means of the roller U¹ to the frame consisting of cross-bar U², slides V and cross-bar V¹. This movement of the shaft D³ is for the purpose of raising the burnishers G, G¹ and letting them fall when they are to be brought into action. To facilitate the action of the cam the weight of the movable parts is counter-balanced by a spring $v$ tending to lift the cross-bar V¹. The crank-disk T causes the separation of the burnishers at the moment of the setting in position of the packing-ring blank by actuating the chain I¹ within the spindle in the following manner: The roller T¹ constituting the crank-pin of the disk T engages a transverse groove in a carriage W, guided by the slides V, along which it can freely run. The said carriage has two ball bearings $w$, between which is held a ring K, adapted to slide with slight friction along the shaft D³. The said ring has a finger $k$ which traverses a longitudinal slot $d^1$ in the shaft D³, the finger being fixed to the chain I¹, and communicating to the same the alternating movement which is transmitted to it by the carriage W, actuated by the crank pin T¹ of the disk T. The elevating and spacing movements of the burnishers are thus carried out simultaneously, but remain independent of one another, which allows of easily regulating the degree of movement of each.

The burnisher carrier D⁴ (Figs. 8 to 11) is constructed to permit the progressive separation of the burnishers G, G¹ for turning over the metal of the washer blanks and also to allow the said burnishers to be suitably spaced according to the diameter of the packing-rings to be produced. The endless-chain I¹, within the shaft D³ passes over a sprocket wheel $i$ and rotates said wheel at each displacement communicated to it by the carriage W as above explained. The said pinion $i$ is mounted freely movable on sleeve 3, at opposite ends of which are mounted toothed wheels 4 and 5 respectively meshing with toothed wheels 6 and 7, on a shaft 8, parallel to the sleeve 3 and situated below same; each half of the shaft 8 is threaded with a screw of steep pitch preferably with multiple threads, the threads being of right-handed direction on one half and left handed on the other as shown. Two half-nuts 9 and 10 each carrying one of the burnishers G, G¹ are in engagement with the oppositely threaded portions of shaft 8 and are consequently separated from one another or brought together according to the direction of rotation given to said shaft, so that rotation of the sprocket wheel $i$ produces the separation or the approach of the burnishers at each displacement of the chain I¹.

Figure 9:
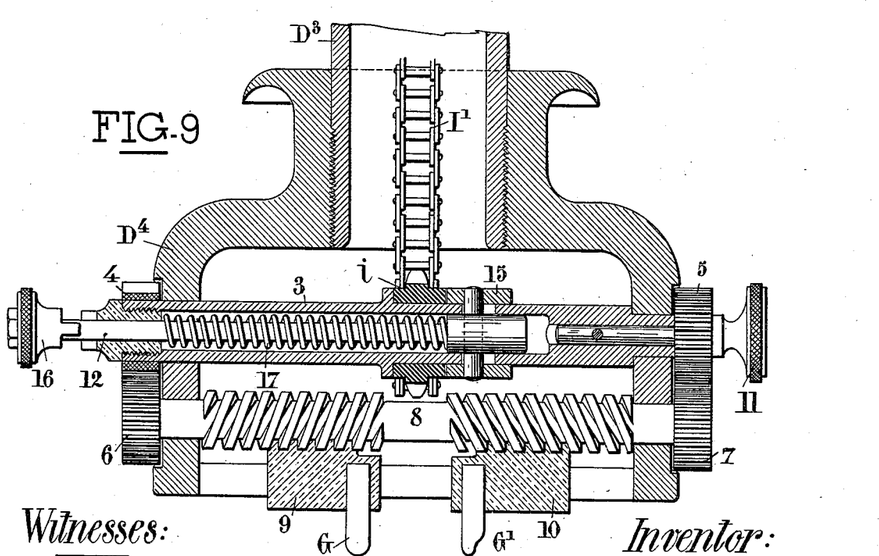
Fig. 9 a similar view to Fig. 8 showing the burnisher support in its normal operating position.
Figure 10:
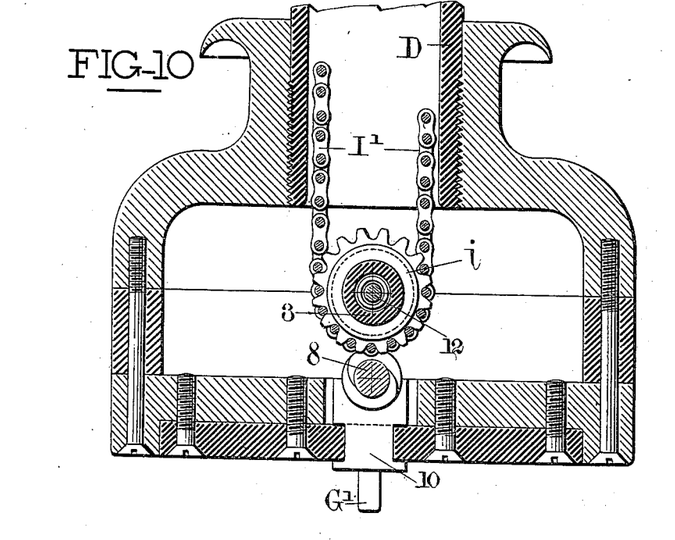
Fig. 10 is a central section through the burnisher support on a plane transverse to that of the section shown in Fig. 8.
Figure 11:
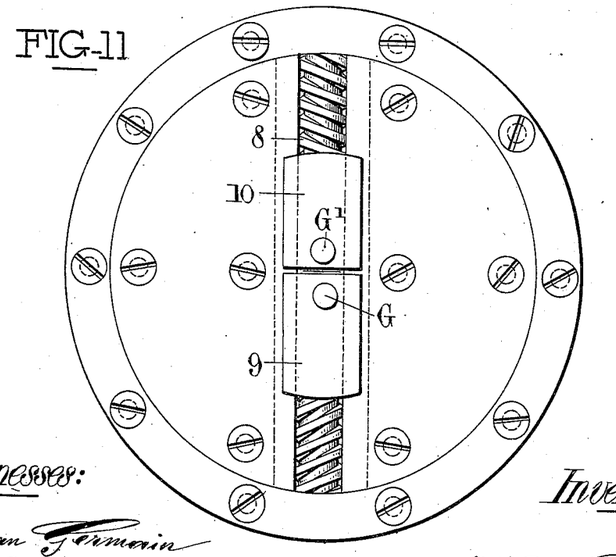
Fig. 11 is a view of the under side of the burnisher support.

To put into action the automatic movement of the burnishers, the sleeve 3 can be coupled to the pinion $i$ by means of a clutch 15 which directly engages said pinion $i$. The clutch is actuated from the exterior by means of a button 16 which controls rod 12 passing through the sleeve 3 and having a shouldered portion 14, traversed by a pin 14ª by which it is connected to the clutch 15. The parts are intended to be normally in such position that the clutch is in engagement with the pinion $i$, as shown in Fig. 9, so that the burnishers are operated by the rotation of said pinion.

Figure 8:
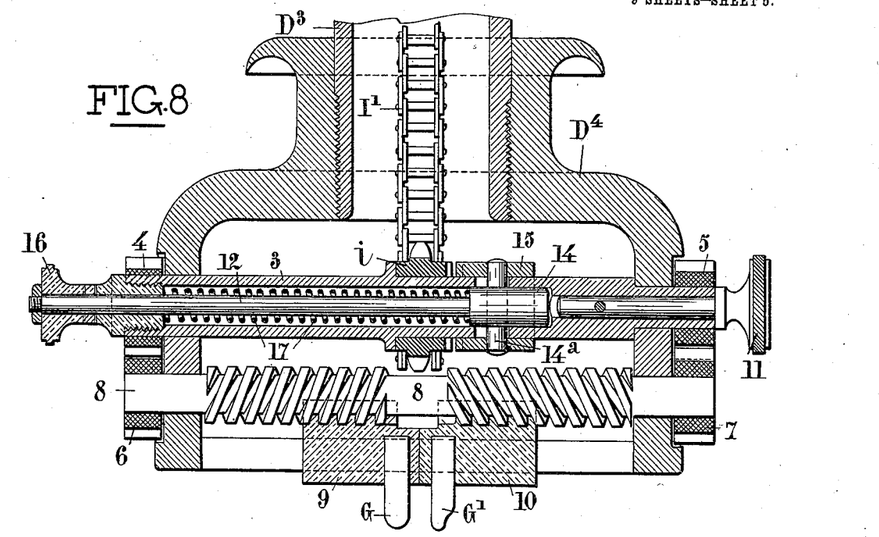

To adjust the spacing of the burnishers, according to the diameter of the packing-rings to be produced, the button 16 is moved to the position shown in Fig. 8 in which the pinion $i$ is released from the clutch 15 which is forced back by the spring 17, and then the button 11 is rotated by which latter operation, the sleeve 3 and the threaded shaft 8, are rotated causing the separation or the approach of the burnishers to the desired distance apart. For automatic action during working, the button 16 is brought to the position shown in Fig. 9, whereby the pinion $i$ is reëngaged with the sleeve 3. The button 16 is held in the position shown in Fig. 9 against the action of the spring 17 by a lug on the button engaging on the solid part of the collar back of the button.

Figure 12:
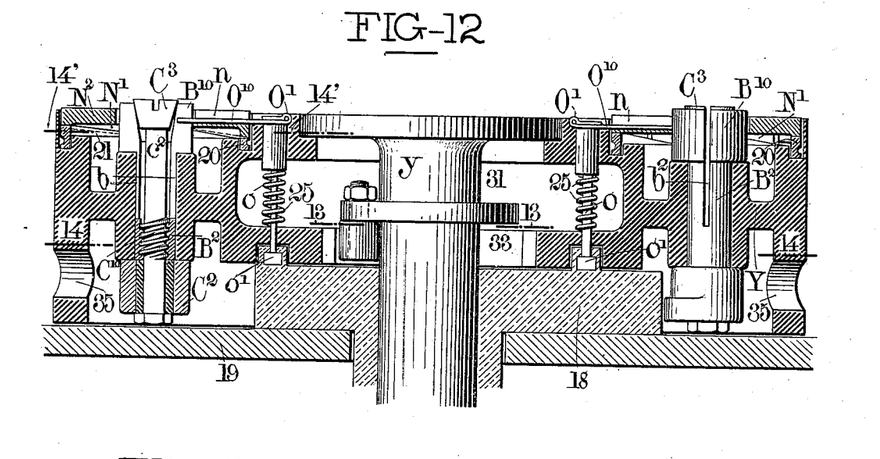
Fig. 12 is a central vertical section of the turntable.
Figure 13:
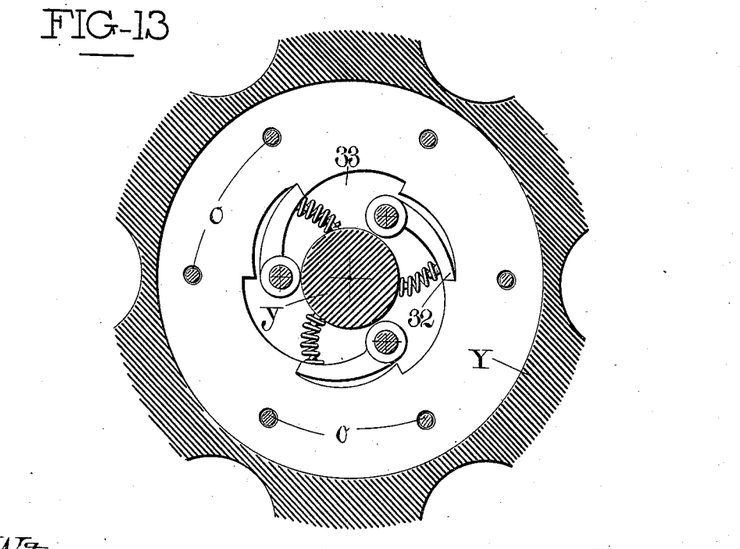
Fig. 13 is a section on the line 13—13 of Fig. 12.
Figure 14:
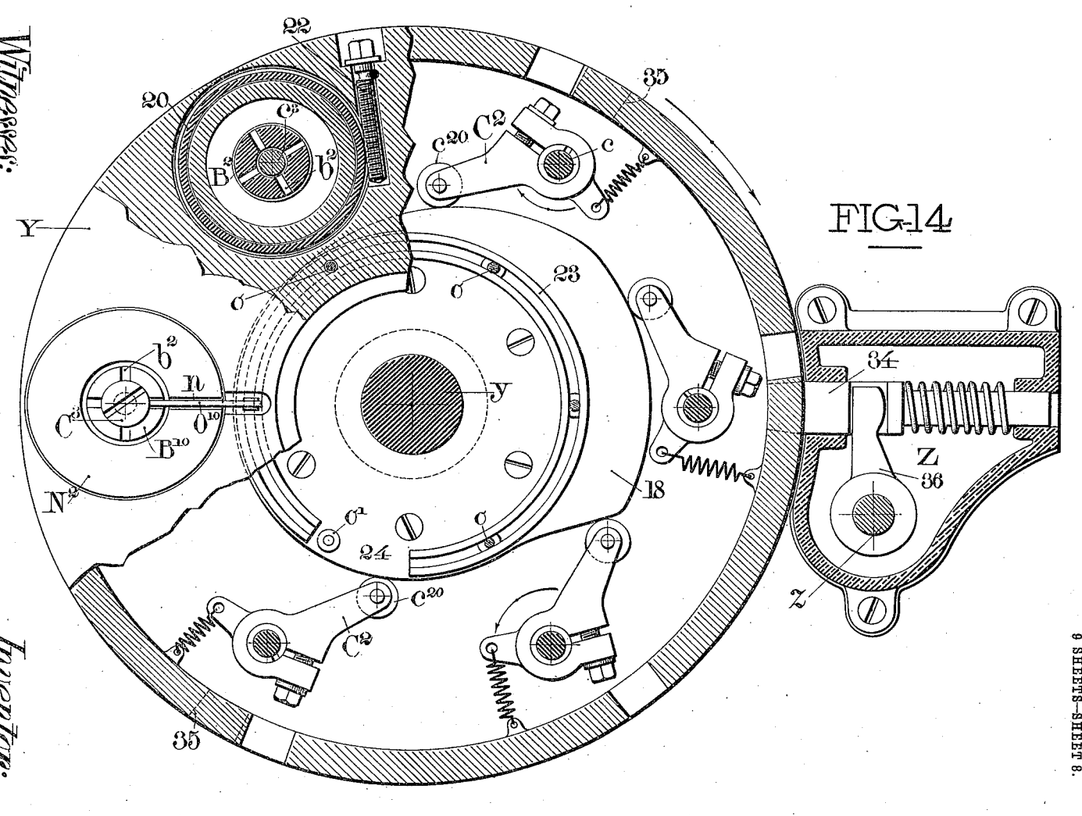
Fig. 14 is a plan of the table and locking device in partial section on the lines 14—14 and $14^1$—$14^1$ of Fig. 12.
Figure 15:
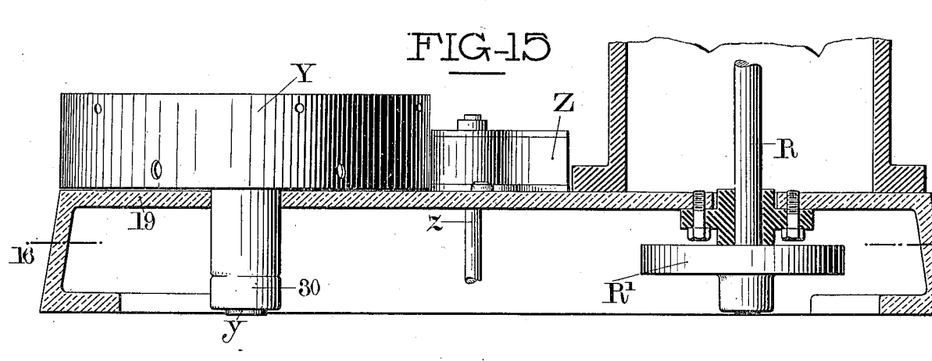
Fig. 15 is a longitudinal vertical section of the base of the machine.

The turntable Y shown in detail in Figs. 12, 13 and 14 is provided with a number of supports for the blanks, and the rotation of said table brings said blanks beneath the burnishers which act on them in sequence as they advance. The table also acts to effect the pressing of the blanks on the supports before they are completed, the centering of the blanks, the loosening of the supports after formation of the rings and the ejection of the finished rings. These various operations are all carried out by the rotary movement of the table, which movement is controlled by the actuating mechanism of the machine. In order that the table at each operation move through a constant angle so as to bring each of the supports exactly below the burnishers, a locking device is provided which secures the table at each of its positions. The table comprises a circular plate or base Y, rotatable about a vertical shaft $y$ and having cells or recesses. In the construction illustrated there are six of said cells being each designed to receive a blank support B². As in the construction described with reference to Figs. 1 to 4 the support $B^2$ is slit as at $b^2$ and the support has a conical bore at its upper part, which receives a pin or rod $C^3$ of which the shank $c^2$ is threaded as at $C^{10}$ and can be screwed thereby in the lower part of the support, thus causing the separation of the divided parts of the support $B^2$ to engage the packing ring of which the flange is to be turned over. At the bottom of the shank $c^2$ is a lever $C^2$ terminating in a roller $c^{20}$ which bears against the side of a fixed cam 18, screwed onto the base 19 of the machine. When the table is rotated, the blanks are held firmly on the supports $B^2$ by the separation of the parts of the latter, by the movement of the cone caused by the action of the screw $C^{10}$, the rotation of which is effected by the roller $c^{20}$ which rolls on the cam 18, and leaves the same when the packing ring is finished, so that the latter is thus automatically released.

The calibrating of the thickness of the ring is obtained by varying the height of the head $B^{10}$ of the support $B^2$ above the plane of the supporting surface. For this purpose the ring rests on a washer $N^2$, the lower surface of which has a projecting crown, provided with a number of helicoidal inclines $N^1$. A pawl or any other device prevents the washer from rotation, said washer resting on a ring 20, which has helicoidal inclines 21 similar to those of the washer $N^2$. This ring is screw-threaded on its periphery, and a tangential screw 22 is arranged to coact therewith which can be turned from outside so as to rotate the ring (Fig. 14). This rotation has the effect of displacing the helicoidal inclines of the ring 20 with regard to those of the washer $N^2$ thus lifting and lowering the latter. The parts may thus be adjusted so that the head $B^{10}$ projects from the support $B^2$ in accordance with the required thickness of the finished packing ring.

The ejection of the finished washer is automatically effected by a plate $O^{10}$, located in a radial groove $n$ in the washer, $N^2$. This plate $O^{10}$ is supported by a rod $o$, terminating below in a head $o^1$ which engages a groove in the cam 23, arranged on the upper surface of the fixed cam 18. The continuity of this cam is broken at 24, being the point at which the ejection has to take place, and this space in the cam allows the rod $o$ to be smartly lifted at the proper moment by a spring 25. After the ejection, the placing of another packing ring on the device depresses the plate $O^{10}$ and the head $o^1$ again engages in the cam groove 23, thus bringing back the plate $O^{10}$ to the level of the washer $N^2$. The said plate $O^{10}$ is hinged at $O^1$ to the upper part of the rod $o$, so that it can be lifted to permit the removal of the washer $N^2$.

The machine can be provided with a number of supports of progressively increasing size corresponding to the various diameters of the packing rings to be manufactured. For each size of support a corresponding set of washers $N^2$ is necessary, the openings of which must be sufficiently large to allow the head of the corresponding support to pass with the necessary play to allow of variation in the diameter of the head of the support.

Figure 16:
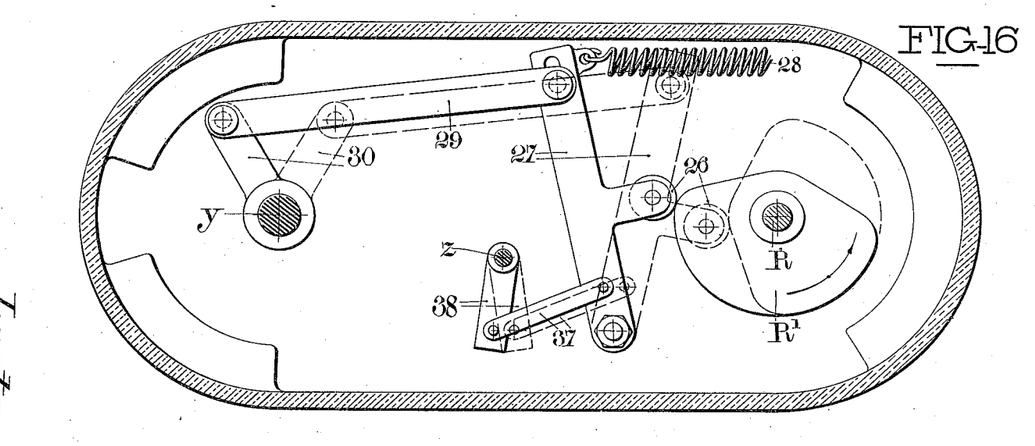
Fig. 16 is a horizontal section on the line 16—16 of Fig. 15.

The movement of the table is effected by the vertical shaft Q. This shaft through the rod R rotates a cam $R^1$, (Figs. 15 and 16) located in the base 19 of the machine. A roller 26 carried by a lever 27, is held in contact with said cam by a spring 28, the lever being capable of oscillations to the limits shown by full and dotted lines (Fig. 16). These movements are transmitted by a link 29 to a lever 30 carried by the pivot $y$ of the table. This pivot carries a disk 31 (Fig. 12) on which are arranged three pawls 32 (Figs. 12 and 13) placed in an opening 33 formed in the table and having the form of a ratchet with six teeth. At each movement of the pivot $y$, caused by the cam $R^1$ and parts described, the pawls 32 cause the table to make a sixth of a revolution, so as to successively bring each of the supports $B^2$ below the burnishers.

For arresting the table at the correct position during each of its displacements a locking device Z is provided comprising a spring bolt 34 which engages one of a series of openings 35 in the periphery of the table. At the commencement of each movement, this bolt is withdrawn by an arm 36 carried by a shaft $z$ actuated by the lever 27 (Fig. 16), through a link 37 and arm 38. At each movement of the table the bolt engages the particular opening and secures the table at the predetermined point.

The machine requires only one attendant, who has to place the blanks on the supports; but this operation could however be effected by any known or suitable form of automatic feed device.

The form and location of different parts of the machine can be modified, the essential feature of the machine being the broad combination of the described mechanisms for the automatic manufacture of the packing rings, for example, the desired result could be obtained by giving the blank a rotary movement, the burnishers being stationary and having only the movement of extension necessary for turning down the metal.

The use of this machine could further be extended for forming the sockets of the blanks in which case the burnishers would be replaced by cutting tools, without such movement of extension, and the outline of the cam controlling the ascent and descent of the tools would be modified so as to provide for progressive cutting operations. These cutting-tools would cut the blank fixed on the table by the means above described.

What I claim as my invention and desire to secure by Letters Patent of the United States is:—

1. In apparatus for the manufacture of metal plastic packing rings, the combination of a blank support, a blank holding device carried thereby, rotary burnishers adapted to act on the blank, and means for automatically adjusting said burnishers to and from their axis of rotation comprising threaded nuts in which the burnishers are mounted, an oppositely threaded spindle engaging said nuts, an endless chain adapted to rotate said spindle and means for imparting reciprocatory movements to said chain, substantially as described.

2. In apparatus for the manufacture of metal plastic packing rings, the combination of a blank support, a blank holding device carried thereby, rotary burnishers adapted to act on the blank, means for automatically adjusting said burnishers to and from their axis of rotation comprising threaded nuts in which the burnishers are mounted, an oppositely threaded spindle engaging said nuts, a reciprocating endless chain adapted to rotate said spindle, a clutch adapted to throw said chain into and out of engagement with the spindle, and independent means for manually adjusting said burnishers, substantially as described.

3. In apparatus for the manufacture of metal plastic packing rings, the combination of a blank support, an extensible holder mounted therein adapted to grip a blank, rotary burnishers adapted to act on said blank, and means for regulating the thickness of the finished blank comprising a blank supporting surface having inclined planes, a ring below said surface having similar coacting inclined planes, and means for rotating said ring to effect displacement of said supporting surface relatively to the blank holder, substantially as described.

In witness whereof I have signed this specification in the presence of two witnesses.

JULES PROSPER GAUTHIER.

Witnesses:
JEAN GERMAIN,
GUILLAUME PIOCHE.

Copies of this patent may be obtained for five cents each, by addressing the "Commissioner of Patents, Washington, D. C."